3,271,181
METHOD OF COATING CARBONACEOUS BASE TO PREVENT OXIDATION DESTRUCTION AND COATED BASE
Robert A. Jewell and Noel T. Wakelyn, Hampton, Va., assignors to the United States of America as represented by the Administrator of the National Aeronautics and Space Administration
Filed May 29, 1963, Ser. No. 284,266
5 Claims. (Cl. 117—46)

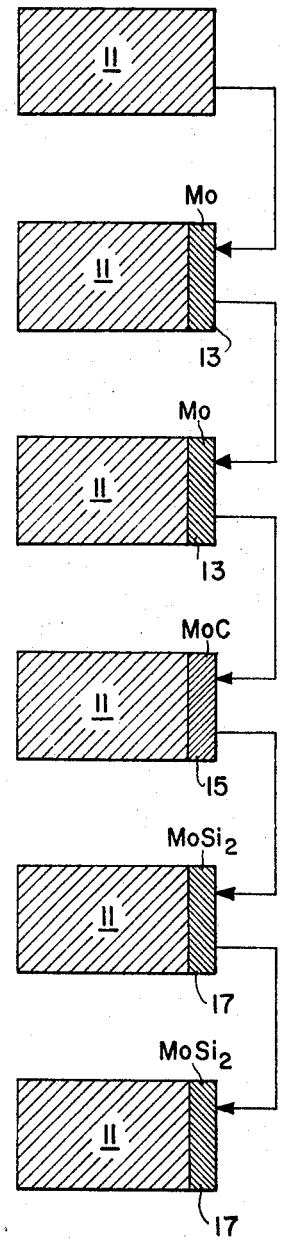

The invention described herein may be manufactured and used by or for the Government of the United States of America for governmental purposes without the payment of any royalties thereon or therefor.

This invention relates generally to the protection of surfaces against erosion and oxidation by applying a protective disilicide coating thereto. More particularly this invention relates to the protection of carbon and graphite bodies from oxidation damage, when in an oxidizing environment, by applying a protective disilicide coating thereon, and to the process for applying this protective disilicide coating to form an impermeable protective barrier for the carbonaceous base.

Carbon and graphite base articles have proven to possess exceptionally good mechanical strength properties when used in the manufacturing of leading edges for high-speed aerial vehicles, rocket nozzles, and protective nose cones for payloads launched into the upper atmosphere by rockets. Graphite, although having good high-temperature strength in comparison with other materials, is nevertheless subject to erosion and oxidation damage caused by high temperatures in the presence of high velocity streams of oxidizing fluids such as air, and methods need to be devised to protect the graphite from such oxidation damage to permit full utilization capabilities of this otherwise durable material. It is known that molybdenum disilicide is a good high temperature oxidation resistant material but well bonded coatings of uniform thicknesses of this disilicide cannot be achieved on carbonaceous substrates by the presently known coating processes.

One previous proposal for protecting graphite and carbon bodies subjected to oxidation damage has been to apply a laminated coating onto the graphite body with the exterior lamination being converted to an impervious nonporous oxidation resistant barrier when subjected to high temperature, high velocity gaseous flow. This proposal is disclosed in applicants' copending application Serial No. 240,760, filed November 28, 1962, and of common assignment. Although this prior art protective measure was suitable for the purposes intended, the process for applying the laminated coating thereon is involved and time consuming. Other prior art proposals for protecting graphite bodies have been to apply various coatings of carbides and nitrides thereto and also to impregnate the porous graphite bodies with metallic substances such as carbides or nitrides. These prior art proposals also have their deficiencies, as pointed out in applicants' copending application.

It is, therefore, an object of the present invention to provide a new carbonaceous article of manufacture which will be protected from oxidation damage by oxidizing fluids at high temperatures.

Another object of the present invention is to provide a carbonaceous article having a disilicide coating forming an oxidation protective barrier for the graphite body.

A still further object of the present invention is to provide a protective coating for carbon articles which will form impermeable barrier protection for the carbon when subjected to high temperatures.

An additional object of the present invention is a new and novel method of applying a disililide protective coating on a carbonaceous base.

According to the present invention, the foregoing and other objects are obtained by applying a coating of molybdenum onto an exposed surface of the carbonaceous body, converting the molybdenum layer into molybdenum carbide, and thereafter, siliconizing the molybdenum carbide layer to form a layer of molybdenum disilicide.

A more complete appreciation of the present invention and many more of the attendant advantages thereof will be readily appreciated as the same becomes better understood by reference to the following detailed description when considered in connection with the accompanying drawings wherein:

The single figure of the drawing is a flow sheet representing the process for applying the final coating of molybdenum disilicide onto a carbonaceous base.

Referring now to the drawing, there is shown a carbon or graphite article 11 which is coated with a layer of molybdenum by conventional flame or plasma spray methods. This coating 13 of molybdenum is easily applied to substrates by the plasma and flame spraying method, but the resulting coating in each process is very porous and not too well bonded to the substrate. The thickness of the coating shown in the figure is in the range of 1.0–3.5 mils and is readily controlled to that desired by either the flame or plasma spray process. This coated article is then conditioned in a high temperature furnace by heating it to a temperature of approximately 2600° F. and, while maintaining this temperature for a period of about five minutes, a flow of inert gas, such for example argon, is flowed through the furnace about the coated article 11, at a flow rate of approximately 1.5 liters per minute. The temperature of the furnace is then increased to approximately 3000° F. and maintained at this temperature for about five minutes while continuing the inert atmosphere therein. The flow of argon, or other inert gas, is then shut off and, while maintaining the temperature of the furnace and the contained coated article 11 therein at about 3000° F., a flow of hydrogen, bubbling through a container of toluene and flowing at a rate of two liters per minute, is passed through the furnace and over the article 11. This five minute processing period carbonizes the molybdenum layer and converts layer 13 into a molybdenum carbide layer 15.

The flow of hydrogen-toluene is then discontinued and replaced by hydrogen gas bubbling through a container of silicon tetrachloride at a rate of approximately four liters per minute, while the temperature of the furnace permitted to cool to, and maintained at, approximately 2150° F. Additionally, excess hydrogen is flowed over another path through the furnace and over the coated material at a rate of about 2 liters per minute to provide an excess hydrogen atmosphere in the furnace for the coated member 11. This siliconizing process requires about ten minutes and converts the molybdenum carbide layer 15 into a layer of molybdenum silicide 17.

After the siliconizing process is completed the furnace temperature is elevated and maintained at 2300°–2500° F. for another ten minutes to condition the coating. After conditioning of the coating, the furnace is allowed to cool to room temperature during which time a flow of inert gas, such for example argon, is again flowed through the furnace at a rate of approximately 1.5 liters per minute.

Subsequent slicing of the coated surface in the cross sectional area shows that the original porous, brittle, fragile, mechanically held molybdenum sprayed coating 13 is now a gas impervious, and extremely well mechanically and chemically bonded, coating on the substrate 11. This final coating 17 is essentially molybdenum disilicide although it is also believed to include silicon-molybdenum silicides, molybdenum carbon silicides, molybdenum carbide and probably traces of silicon carbides also. The siliconizing process described hereinbefore is the conventional vapor deposition process with sufficient silicon being deposited onto the coated layer 15 to form molybdenum-carbon-silicides with a thin outer layer of free silicon. This results in a closing of the pores in the molybdenum due to the silicon addition and the coating now progresses in outward to inward cross section from, silicon-molybdenum silicides, to molybdenum-carbon silicides, to molybdenum carbide, to the carbon or carbonaceous body 11. The resultant coating 17 is also essentially the same thickness as the original coating 13 of molybdenum which is initially deposited onto carbonaceous body 11.

It is thus seen that by the use of the present invention a molybdenum coating can be changed from a weak mechanical bond with a carbonaceous substrate to a strong chemical-mechanical bond and thereby produce a relatively stable coated article for high temperature uses. Coating 17 is oxidation resistant and remains a gas tight unitized coating when subjected to a high velocity stream of oxidizing fluid, such as air.

Tests in a resistance heating facility have indicated that the hereinbefore described coated article undergoes cyclic heating without spalling. This is in contrast to the case when molybdenum disilicide is applied directly onto a substrate, as by flame spraying the powder onto the substrate. The disilicide coating when directly applied, easily spalls and gives extremely poor oxidation protection in comparison with the converted molybdenum coating described in the present invention.

It is to be understood that the above described process is given by way of example only and that numerous modifications are readily apparent to those skilled in the art. For example, the specific rates of flow for the various gases passing over the heated coated article, as well as the specific temperatures mentioned, are given as illustrations only and may, in some instances, be changed without departing from the scope of the invention.

Also, the use of other high melting point, high stability disilicides may be employed to provide oxidation resistant protective coatings for carbonaceous substrates within the teaching of the present invention. For example, although the process and article described herein is particularly related to molybdenum disilicide, it is obvious to those skilled in the art that this process is equally applicable to other disilicides, such for example those of tungsten, tantalum, and niobium.

It is therefore to be understood that within the scope of the appended claims, the invention may be practiced otherwise than as specifically described.

What is claimed and desired to be secured by Letters Patent of the United States is:

1. An article of manufacture comprising:
   a carbonaceous member having
   an oxidation protective coating integrally formed on an exposed surface thereof,
   said coating being essentially molybdenum disilicide and being formed by (a) depositing a layer of molybdenum onto an exposed surface of said carbonaceous member, (b) conditioning the coated member at an elevated temperature and in an inert gaseous environment, (c) carbonizing said coating under said elevated temperature condition, (d) siliconizing said coating in the presence of an excess of hydrogen while maintaining said elevated temperature condition, (e) further conditioning said coating in the presence of hydrogen in the temperature range of 2300–2500° F. for approximately ten minutes, and (f) cooling the coated base to room temperature in an inert gaseous atmosphere.

2. A method of preventing oxidation destruction of a carbonaceous base member comprising the steps of:
   providing a carbonaceous base member,
   flame spraying a layer of molybdenum onto an exposed surface of said carbonaceous base member,
   heat conditioning the coated base under elevated temperature conditions for a predetermined period of time,
   carbonizing said coating under said elevated temperature conditions,
   siliconizing said coating in the presence of an excess of hydrogen while under said high temperature condition,
   further conditioning said coating in the presence of hydrogen and in the temperature range of 2300–2500° F. for approximately ten minutes, and
   cooling the coated base to room temperature in an inert gaseous atmosphere.

3. A method as in claim 2 wherein:
   the conditioning of the coated base prior to carbonization thereof is achieved while said temperature is maintained at about 2600° F. for approximately five minutes and at about 3000° F. for an additional five minutes,
   said inert gaseous atmosphere being provided by a flow of argon gas over the coated base, and
   the flow rate of said argon being approximately 1.5 liters per minute.

4. A method as in claim 2 wherein:
   the carbonizing of said coating is accomplished in a high temperature furnace with the temperature thereof maintained at approximately 3000° F.,
   said furnace receiving, during the carbonizing of the coating, a hydrogen gas flow of about two liters per minute passing therethrough and over the coated base member,
   said hydrogen flow being bubbled through toluene prior to entering said furnace.

5. A method as in claim 2 wherein said siliconizing of said coating is conducted in a high temperature furnace,
   said furnace temperature during the siliconizing step being maintained at about 2200° F. for approximately ten minutes,
   a hydrogen gas flow of approximately four liters per minute bubbled through liquid $SiCl_4$ and passed over the heated coated base member during this time interval, and
   a hydrogen gas flow of about two liters per minute also being passed through the furnace during this time interval by another path to provide an excess hydrogen atmosphere for said coated member.

References Cited by the Examiner
UNITED STATES PATENTS

| Re. 24,231 | 10/1956 | Matejka | 117—46 |
| 2,745,932 | 5/1956 | Glaser | 117—69 X |
| 2,946,668 | 7/1960 | Richelsen | 117—46 |
| 3,054,694 | 9/1962 | Aves | 117—46 |
| 3,177,084 | 4/1965 | Arnstein | 117—46 |
| 3,178,308 | 4/1965 | Oxley et al. | 117—107 |

OTHER REFERENCES

WADC Technical Report 53–457, September 1954, Molybdenum Disilicide Coating for Graphite, Battelle Memorial Institute (6 pp. introduction, 27 pp. text, pp. 1–6).

MURRAY KATZ, *Primary Examiner.*

WILLIAM D. MARTIN, *Examiner.*